United States Patent [19]

Benton

[11] 4,387,763

[45] Jun. 14, 1983

[54] MULTISTAGE THERMOSTAT USING MULTIRATE INTEGRAL ACTION AND EXPONENTIAL SETPOINT CHANGE

[75] Inventor: Ronald Benton, Minneapolis, Minn.

[73] Assignee: Honeywell Inc., Minneapolis, Minn.

[21] Appl. No.: 301,679

[22] Filed: Sep. 14, 1981

[51] Int. Cl.³ .............................................. F25B 29/00
[52] U.S. Cl. .................................... 165/29; 236/1 EA; 318/609; 62/160; 307/39
[58] Field of Search ...................... 165/29, 12, 26; 236/1 ER, 1 EA, 1 EB, 46 R, 78 D, 46 F; 62/160; 318/609, 610; 307/39

[56] References Cited

U.S. PATENT DOCUMENTS

| | | | |
|---|---|---|---|
| 2,946,943 | 7/1960 | Nye et al. | 236/78 D |
| 3,500,898 | 3/1970 | Gerhart, Jr. et al. | 236/78 D |
| 3,834,617 | 9/1974 | Dyntar | 236/46 R |
| 4,199,023 | 4/1980 | Phillips | 236/46 F |
| 4,246,956 | 1/1981 | Drucker | 165/29 |
| 4,270,693 | 6/1981 | Hayes | 236/46 F |
| 4,332,352 | 6/1982 | Jaeger | 165/29 |
| 4,347,974 | 9/1982 | Pinckaers et al. | 165/12 |
| 4,366,534 | 12/1982 | Kompelien | 236/46 F |

Primary Examiner—Albert W. Davis, Jr.
Assistant Examiner—S. Dotson
Attorney, Agent, or Firm—Alfred N. Feldman

[57] ABSTRACT

A multistage thermostat means that is adapted for use with equipment such as a heat pump and auxiliary heat and which effects efficient operation upon a temperature setup after a nigh setback function by introducing an exponential change in the apparent control setpoint. The sensitivity of the signal processing channel of the system is altered to maintain stability. The system further contains a power-up reset function that also alters the signal processing channel for rapid reestablishment of normal control.

19 Claims, 4 Drawing Figures

MULTISTAGE THERMOSTAT USING MULTIRATE INTEGRAL ACTION AND EXPONENTIAL SETPOINT CHANGE

CROSS-REFERENCE TO RELATED APPLICATIONS

On Jan. 30, 1981 two applications relating to this subject matter were filed in the names of R. Benton and T. S. Jaeger. The Benton application Ser. No. 229,689, now abandoned, is entitled Multistage Thermostat Using Integral Action and Cycler. The T. S. Jaeger application Ser. No. 229,690 now U.S. Pat. No. 4,332,352 is entitled Multistage Thermostat Using Integral Initiation Change Means.

BACKGROUND OF THE INVENTION

Multistage heating plants have been in use for many years, and typically are made up of heating equipment that provides heat from two different sources. Examples of such multistage heating plates are plants which include heat pumps with auxiliary electric resistance heat, heat pumps with auxiliary gas furnaces, and solar energy sources with auxiliary heat of either electric or fossil fuels. The reason for using heating plants that have primary and secondary fuel sources is to take advantage of a lower cost heating fuel with the use of the primary source, and then utilizing the secondary source which requires a more costly fuel.

In recent years, to increase the cost efficiency of the use of multistage equipment, it has been common to install outside temperature sensing equipment to aid in the staging of the primary and secondary heating plants. As is well known, it is more efficient to provide heat by operating a heat pump than by the use of a secondary heating source such as electric heat. As this is the case, it is desirable to prevent the electric heat from becoming operable if the primary source, the heat pump, can handle the heating load by itself. Where a multistage system is operated at a constant indoor temperature, this creates no significant problem. If the indoor temperature is held constant, the natural variations in outdoor temperature cause the heat pump and its auxiliary heat to be staged in its most efficient manner. That is, the heat pump will supply heat until it is no longer able to maintain a stable temperature and then the auxiliary or electric heat will be brought into operation. A drawback, however, even with constant setpoint conventional multistage thermostats is the excessive offset or droop required to initiate operation of the auxiliary heating stages. To enhance comfort, outdoor sensors are frequently applied to reset or dedroop the thermostat control point. The effectiveness of outdoor reset depends on matching the reset means to the heating system capacity and the design weather conditions.

In order to save energy, it has become commonplace to provide a night setback function to many thermostats along with its associated day setup function. These functions provide for a lower nighttime temperature within the heated building, and a morning pickup or return to the normal daytime ambient temperature. Where night setback and morning pickup are provided, a heat pump may not be operated in its most efficient mode. For example, in the morning when the thermostat is returned to normal daytime ambient temperature control, the heat pump is turned on along with a number of stages of electric heat. This morning pickup therefore utilizes both the primary and secondary heating sources at the same time regardless of whether or not the heat pump alone might be capable of bringing the temperature of the building up to the setpoint temperature if given sufficient time. In order to prevent this type of a system from having the electric heat staged on at the time of morning pickup, many installations contain outside thermostats which lock the electric heat off if the outdoor ambient is above some predetermined temperature. This type of system is expensive and inefficient. It is expensive from the point of view that it requires an outside temperature sensing device and auxiliary control equipment, along with the loss of efficiency as many installers misadjust the equipment so that electric heat is brought on even though it would not be required to bring the building up to the normal daytime ambient. Moreover, the outdoor temperature at which the heat pump alone is capable of meeting the building heating demand varies depending upon solar, wind, and internal heat (occupants, lights, etc.) gains and losses. These effects can render even a properly adjusted outside thermostat inefficient.

In summary, it is common in the control of heat pumps with auxiliary heat, particularly electric heat, to install outside sensing equipment that reduces control point offset (droop) and overrides effects of setpoint changes in setup in the morning setback at night. The installation of this extra equipment, and the deficiencies in its adjustment and effectiveness, make the operation of heat pump equipment and auxiliary heat marginal in many types of installations. In some localities, the electric utilities supplying power have suggested that heat pump installations be operated without night setback and morning pickup just because of the conditions recited above.

SUMMARY OF THE INVENTION

The present invention is directed to a multistage thermostat means that is particularly adapted to operate a heating plant having a primary heating source and a secondary heating source, such as a heat pump with auxiliary heat. While the present invention is applicable to any type of any multistage temperature control where a primary heating source and a secondary heating source are used, it will be specifically described in the context of a multistage thermostat for controlling a heat pump with a plurality of stages of auxiliary electric heat. The reason is that this is the most common type of multistage application for the present invention.

The present invention provides for night setback and morning setup or pickup in a manner that will most efficiently utilize the operation of a heat pump without unnecessarily causing the auxiliary heat to become energized. The present invention accomplishes this mode of operation without any type of outside sensing or field adjustment of outside located equipment. The present invention also provides multistage control of any number of stages of heating equipment without offset or droop, and without any type of outside sensing or field adjustment of outside located equipment.

This invention further utilizes a multistage thermostat that has an internal clock that provides time control for night setback and morning setup. When a large change in the setpoint is provided to the thermostat by the clock means, the present thermostat is capable of operating a heat pump and auxiliary heat in an efficient manner. In morning setup, the present system provides for the energization of the heat pump, but generally keeps the auxiliary heat in a deenergized state. If the heat pump is unable to pick up the heating load within a preestablished period of time, the additional stages of electric heat are energized to pick up the load in a more conventional manner.

The function described for control of the heat pump in setup and setback is accomplished by operating an integrator means that has a stored time integral value of the deviation, or error in control point, from the setpoint in parallel with a proportional type of control system, and summing the two signals together as a continuous composite error signal. This composite error signal is then supplied to a multistage cycler which is a device that progressively brings on stages of heating. Each stage has a hysteresis control function and by continuously increasing the composite error signal, stages of heating, from the primary through the secondary stages, can be progressively brought on in the most efficient manner. Efficient operation in setup is accomplished by generating an "effective" setpoint that rises exponentially from the setback value to the setup value in a manner approximating the dynamic response of the building. During this transient, the integrator means gain is reduced until the setup control point is established.

During isolated conditions like power-up of the controller, efficient control is accomplished by raising the setpoint in this exponential fashion from the existing control point to the desired setpoint if the deviation is large, or by operating the integrator means with a large gain to rapidly establish its appropriate value if the existing control point is near the desired setpoint.

DESCRIPTION OF THE PREFERRED EMBODIMENT

Figure 1:
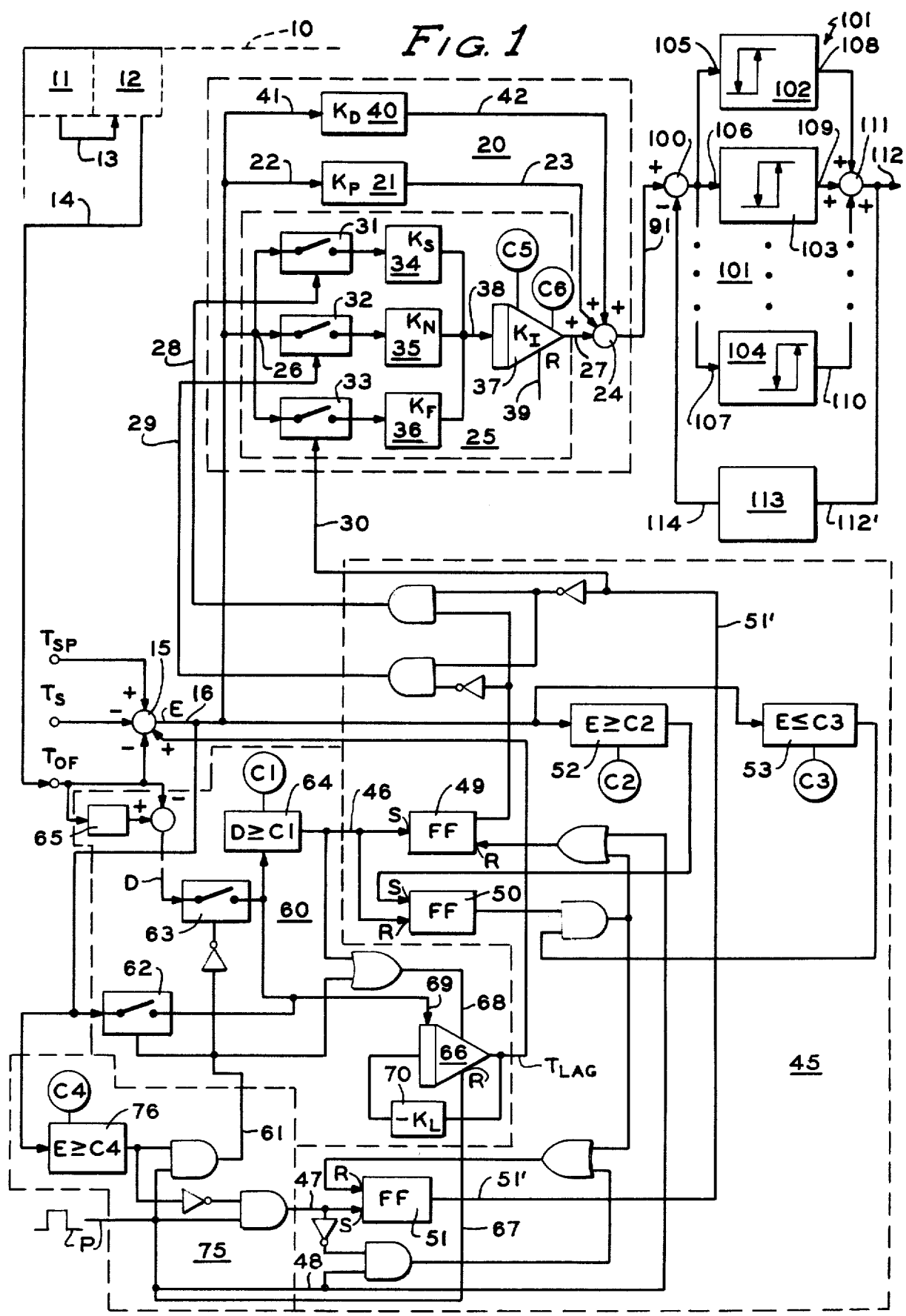
FIG. 1 is a block diagram of a multistage thermostat means.

In FIG. 1 there is disclosed a schematic representation of a multistage thermostat means generally disclosed at 10. While the multistage thermostat means 10 of the present invention can be used with many types of heating plants having a primary heating means and a secondary heating means, the present disclosure will refer specifically to a heat pump as the primary heating means and stages of electric heat as the secondary heating means. This type of heating plant readily benefits from a multistage thermostat means of the type disclosed in FIG. 1.

The thermostat means 10 includes a clock means 11. The clock means 11 can be any type of clock that is capable of providing a continuous series of timed intervals. In the present day technology, the most common type of clock suitable for this application is a crystal controlled oscillator and frequency divider means to provide a series of accurately timed clock pulses. The clock pulses are used in the thermostat means 10 for multiple functions such as a conventional clock display, night setback, and morning setup functions. The only timing function that will be discussed is the function wherein the clock means 11 supplies the multistage thermostat means 10 with a continuous series of timed intervals that are used for providing for a night setback function and its accompanying setup function as are disclosed generally at 12. This function relies at 13 on a signal from the clock means 11, and provides an output 14 which is used to change a temperature setpoint offset means $T_{of}$. This setpoint offset means could be any type of offset means including a manual setpoint type of change means that provides a setpoint change signal $T_{of}$. The setpoint temperature $T_{sp}$ is the conventional setpoint of a thermostat which can be manually set into the thermostat means 10 by adjusting a lever, dialing in a numerical value, or pushing buttons to establish a digital input which in turn establishes a setpoint for the thermostat means 10. In the present discussion, a single setback setpoint change and a single setup or morning pickup change is programmed by means 12, and will be discussed in the description of the operation of the thermostat means 10. The number of setback times and morning pickup or setup times is strictly a function of the design of the thermostat and can vary from a single combination of setback and setup to multiple combinations of times and corresponding setpoints.

Thermostat means 10 further has an input in the form of a temperature sensing means $T_s$ which provides a signal that is responsive to the ambient temperature to be controlled by the operation of the heat pump and electric heat controlled by the thermostat means 10. The temperature sensing means $T_s$ can be any type of sensing means, but most typically would be a thermistor and bridge arrangement having an output signal at $T_s$ which is representative of the temperature in the ambient being controlled.

The temperature sensing means $T_s$, the programmed temperature offset means $T_{of}$, an exponentially decaying temperature bias signal $T_{LAG}$ (to be described), and the variable temperature setpoint means $T_{sp}$ are summed in a first summing means disclosed at 15. The output of the summing means 15 is provided on a conductor 16 and is representative of a current temperature error E that exists between the "effective" setpoint of the thermostat means 10, and the temperature $T_s$ which is the temperature sensed by the thermostat means 10.

The current temperature error E on conductor 16 is connected to a signal processing means generally disclosed at 20. The signal processing means 20 is made up of two or more signal processing paths or channels. The first signal processing channel includes a proportional constant means 21 which has an input 22 connected to the current temperature error E and has an output 23 connected to a second summing means disclosed at 24. A second or integrator signal processing channel is disclosed at 25 and includes an integrator means 37 (to be described) with a stored time integral value of the temperature error E that has a continuous input 26 connected to the current temperature error E, and has a continuous output 27 that is connected to the second summing means 24. Three logic inputs 28, 29, and 30, are provided and can selectively close one of three switches 31, 32, and 33 respectively, thereby switching the current temperature error E through appropriate gain constants 34, 35, or 36 to select the gain of the signal processing channel 25. The gain constants are a slow gain constant $K_S$ indicated at 34, a normal gain constant $K_N$ indicated at 35, and a fast gain constant $K_F$ indicated at 36. The integrator signal processing channel 25 is further disclosed as having an integrator means 37 with a continuous input 38, whose output is limited between constants C5 and C6 and can be reset to C5 by a logic input 39. This type of integrator means is well known in the art of process control.

The signal processing means 20 is completed by a differentiating or rate determining channel disclosed at 40 that has an input 41 connected to the current temperature error E, and has an output 42 consisting of the time rate of change of the current temperature error E, connected to the summing means 24. While three signal processing channels have been disclosed in the signal processing means 20, the device is functional (and basically will be described) as operating with the integrator channel 25 in combination with the proportional constant channel 21. In some cases a differentiating channel 40 will be used, but is an optional processing function. It will be understood that the current temperature error E on conductor 16 is fed to the parallel combination of the proportional constant channel 21, and the integrator channel 25. The proportional constant channel 21 could be just a conventional amplifier with any type of a gain, typically a gain of 1, while the integrator channel 25 is a conventional integrating circuit that provides for an integration of the input signal with respect to time thereby providing an output signal that will be described in connection with FIG. 2.

An integrator gain control logic means is disclosed generally at 45. Functionally this logic means accepts discrete inputs 46, 47, and 48 to select the appropriate integrator gain by way of outputs 28, 29, and 30 (which are three inputs to the second signal processing channel 25). Further, the integrator gain control logic means 45 monitors the current temperature error E to select the normal integrator gain when steady control is established. Logic means 45 also contains three flip-flops 49, 50, and 51 (having output conductor 51'), and two comparators 52 and 53 which compare the current temperature error E to constants C2 and C3, and whose outputs are logic true or false signals. The disclosure of logic means 45 is completed as various AND, NOT, and OR logic gates to provide set, reset and control logic for the operation of the logic means 45.

An exponentially decaying bias means is generally disclosed at 60. Functionally the bias means 60 generates a signal $T_{LAG}$ to create an "effective" setpoint that rises exponentially from one level to another. The bias means 60 accpets the continuous inputs of current temperature error E, the programmed temperature offset means $T_{of}$, a discrete input 61 to generate the output $T_{LAG}$, and the integrator gain control logic means input 46. Bias means 60 is further disclosed as containing logic controlled switches 62 and 63, a comparator 64, a zero order hold circuit 65, and a three-mode integrator 66. Switch 63 is normally closed during the operation of the load controlled by the thermostat means 10. Integrator 66 is disclosed as having an output capable of being reset to zero by an input 67, or initialized to a value on input 69 by input 68; if neither 67 or 68 are energized, integrator 66 operates as a normal time-based integrator. A negative exponential constant feedback 70 is provided around the integrator 66.

A power-up reset means is generally disclosed at 75. Functionally this reset means accpets a power-up pulse P generated by some external means and the current temperature error E from conductor 16 to generate an output 61 to the exponentially decaying bias means 60. The power-up reset means 75 further has two outputs 47 and 48 connected to the integrator gain control logic means 45 to raise the "effective" setpoint exponentially from the existing control point to the desired setpoint if the deviation is large or to operate the integrator channel means 25 with a large gain to rapidly establish its appropriate value if the existing control point is near the desired setpoint. Reset means 75 is further disclosed as containing a comparator 76 that compares the error signal E against a constant C4. The reset means 75 is completed by several conventional logic gates.

To this point in the description, a portion of the thermostat means 10 has been described which is capable of comparing the setpoint temperature $T_{sp}$ and the temperature being sensed $T_s$, and manipulating those values to provide a continuous composite error signal on conductor 91 which will provide the necessary and desired control of the heating plant that is operated by the thermostat means 10. The thermostat means 10 is completed by connecting the conductor 91 to a summing means 100 that acts as an input to a multistage cycling means generally disclosed at 101. The multistage cycling means 101 has as many independent stages as there are stages in the primary heating means and the secondary heating means taken together. Each of the stages are disclosed separately and are identified as stage 102, 103, and 104. Each of the stages 102, 103, and 104 have an "on-off" hysteresis loop function and this will be more readily understood in connection with the description when considered with a graph of FIG. 2. As the continuous composite error signal on conductor 91 is summed into the summing means 100, it drives in input at 105 for the stage 102, at 106 for the stage 103, and at 107 for the stage 104. Each of the hysteresis loops within the individual stages 102, 103, and 104 are offset from one another so that the functioning from an "off" state to an "on" state for each individual stage does not overlap. The individual multistage cycling means components 102, 103, and 104 can be designed using any type of electronics. These merely are stages of off-on control which have a conventional hysteresis type loop from the "off" to the "on" states, and each of the stages are offset from one another, as will be disclosed in FIG. 2.

The stage 102 has an output at 108, the stage 103 has an output at 109, and the stage 104 has an output at 110. All of these outputs are summed together at 111 and form an output for the thermostat means 10 at 112. The output 112 drives the various stages of the primary heating means and the secondary heating means as will be apparent in connection with FIG. 2. To complete the disclosure of the multistage cycler means 101, an anticipator means 113 is connected between the output 112 and the summing means 100. This is an optional feature and is normally used in the thermostat art. The anticipation means 113 is any type of signal source compatible with the summation means 100 that is energized upon operation of any of the stages 102, 103, and 104 and supplies a lag signal as negative feedback to anticipate the operation of the system. The anticipator 113 is of a conventional design, either analog or digital, and receives its input energy from conductor 112' connected to the output 112 for the overall system.

Figure 2:
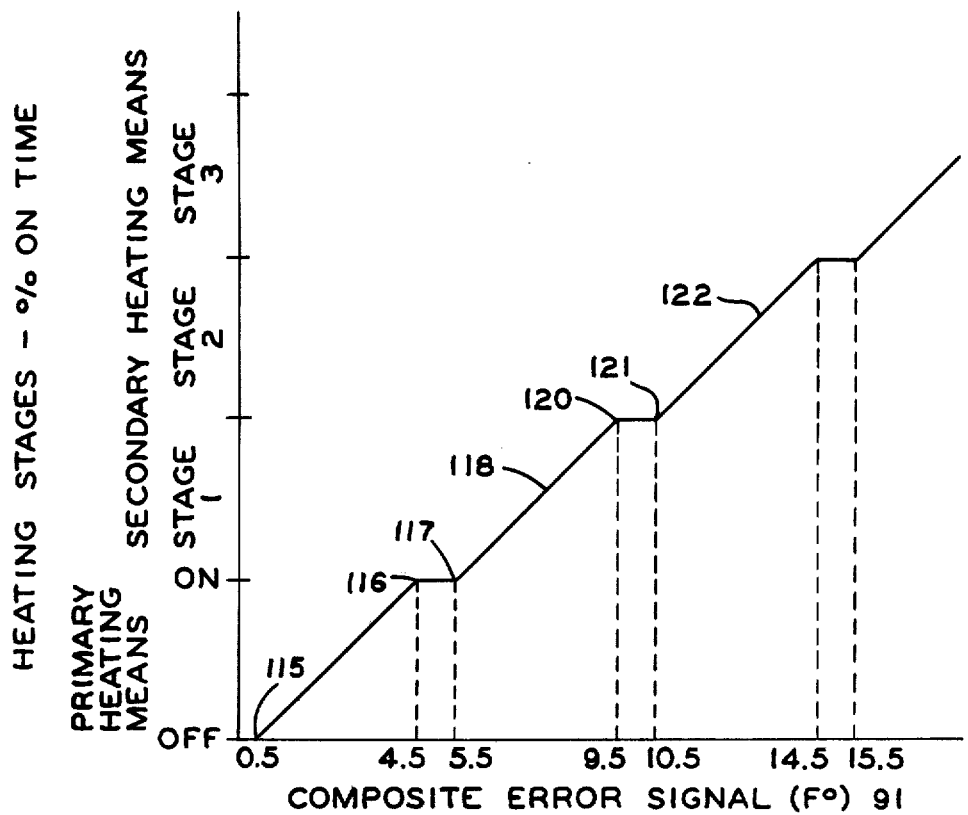
FIG. 2 is a graph of a multistage cycler used for control with the thermostat disclosed in FIG. 1.

Before any attempt is made to describe the operation of the thermostat means 10, the graph of FIG. 2 should be considered. The graph of FIG. 2 is a graph of the function of the cycler means 101 wherein a composite error signal in degrees Fahrenheit is provided on conductor 91 versus the percent "on" time of the primary and secondary heating stages or heating plant means. The curve of FIG. 2 starts at approximately one half degree of composite error signal at 115 where the primary heating means or heat pump is in an "off" state. As the composite error signal 91 increases to 4.5 degrees, the curve increases to a point 116 at which time the primary heating means or heat pump is in a full "on" condition. That is, the heat pump is on 100 percent of the time. If the composite error signal 91 continues to increase by more than one degree to point 117, the curve of the composite error signal 91 versus the heating stages increases as at 118. This brings "on" the first stage of electric heat. The percent on time for the first stage of electric heat continues to increase until the composite error signal 91 reaches an error signal equal to 9.5 degrees Fahrenheit at 120 where an interstage differential of one degree again occurs. If a further one degree in differential of composite error signal 91 occurs to that the curve reaches 121, the next stage of electric heat comes "on" as shown by the curve at 122. This continues on with as many stages of electric heat as are present and the first three stages described in connection with FIG. 2 agree with the disclosure of the stages 102, 103, and 104 of the multistage cycler means 101. It is apparent that as the signal on conductor 91 continues to increase in value, the inputs to the stages 102, 103, and 104 continue to move up along the curve as disclosed in FIG. 2 thereby bringing on the heat pump, stage one, stage two, and stage three, etc. as is needed for any particular installation. It is thus apparent that by providing a continuously increasing composite error signal 91 to the summing means 100 that any number of desired stages can be controlled in an off-on fashion to provide a multistage thermostat means 10 that is capable of operating a heating plant having both a primary heating means and a plurality of secondary heating means.

Figure 4:
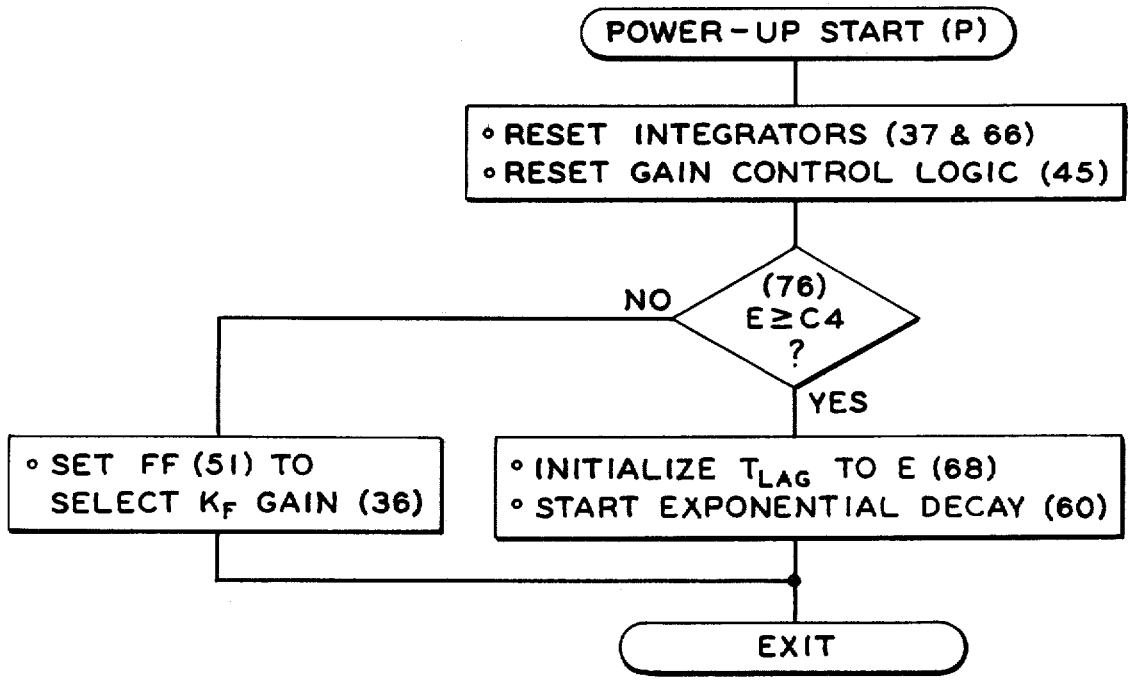
FIGS. 3 and 4 are flow charts of the operation of the multistage thermostat.
Figure 3:
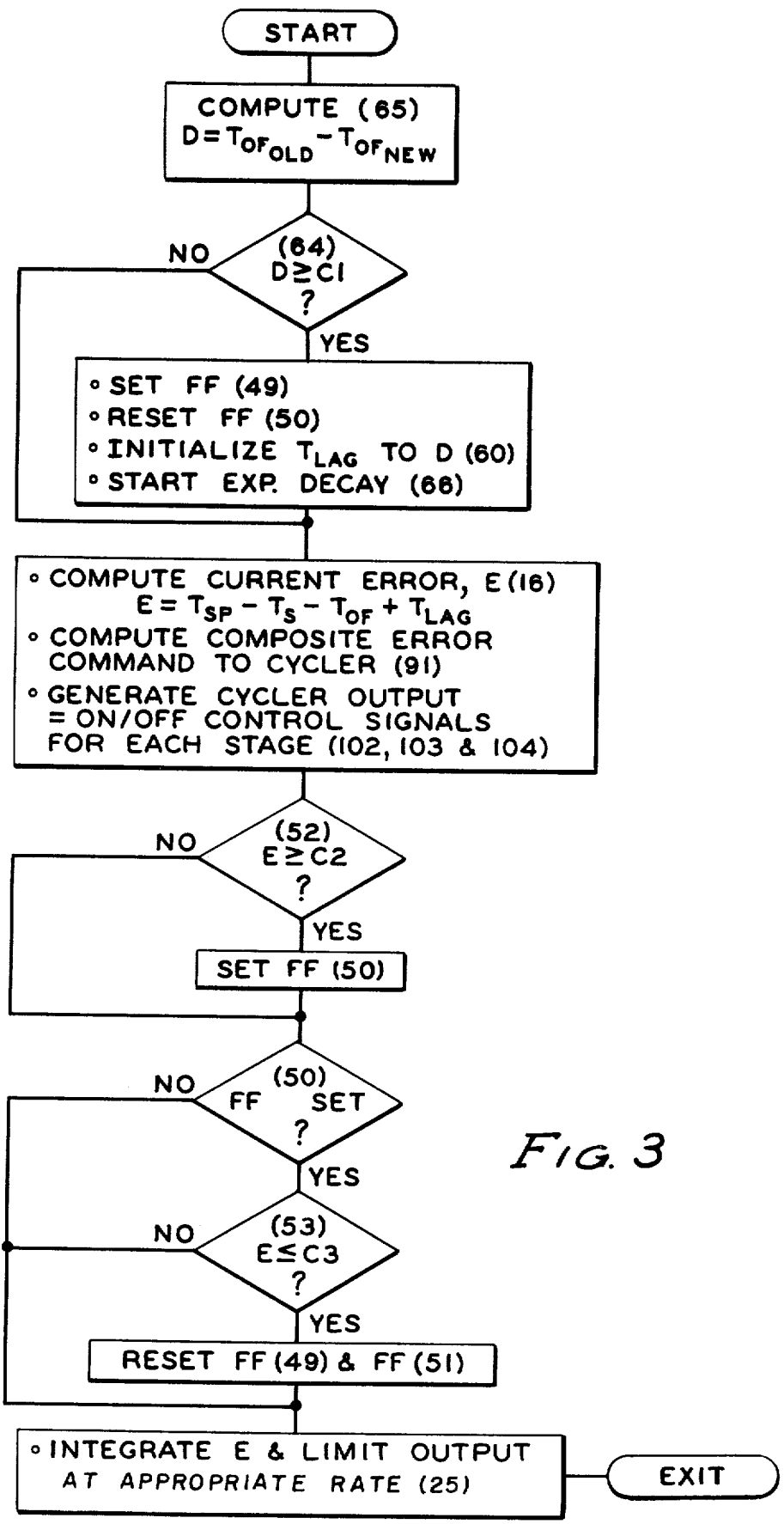

The operation of the multistage thermostat means 10 disclosed in FIG. 1 and 2 can best be understood by considering specific examples. FIGS. 3 and 4 have been provided as flow charts of the functional operation of the various components of thermostat means 10. The flow charts of FIGS. 3 and 4 are substantially self-explanatory. Each of the functions has been stated in conventional text with a reference number indicating the component, subsection or section of the device wherein the function or decision is being made. More specifically, in FIG. 3 there is disclosed a flow chart for the thermostat means 10 in its normal operating mode. In this normal operating mode, the system computes whether a change has occurred between the existing setpoint and a prior setpoint. This change then is used to determine whether the thermostat means 10 operates in a conventional or normal mode, or whether a setback or setup function has occurred. The flow chart then determines the correct composite error signal on conductor 91, and causes the operation of the appropriate level of the cycler means 101. The system also then determines the status of the flip-flops 49, 50, and 51 and the switch means 31, 32, or 33 to provide the integrator means 37 of the signal processing channel 25 with the appropriate constant. In FIG. 4, the logic used in a power-up start of the device is shown separate from the balance of the system. The power-up pulse P is used to reset the necessary integrators and gain control logic means. After this has been accomplished a comparison is made to establish the proper mode of operation of the thermostat means 10.

In operation, the easiest mode of operation to consider is constant setpoint operation where the temperature offset $T_{of}$ is zero. Consider the condition where the change in $T_{of}$, disclosed as signal D, is a result of the summing of $T_{of}$ and the output of the zero order hold means 65, is zero. The exponential decay bias means 60 is not activated so $T_{LAG}$ is zero, and the integrator gain control logic means 45 has selected the normal gain constant 35 through switch 32 by way of output 29. A composite error signal 91 will thus be generated to command and cycling means 101 to lock on and/or cycle the appropriate heating stages to maintain the control point at the desired setpoint $T_{sp}$. The presence of the integrator signal processing channel 25 accomplishes this without offset (droop).

To initiate a 10 degree Fahrenheit setback with a $T_{sp}$ of 70 degrees Fahrenheit, the setup and setback means 12 would change the programmed temperature offset $T_{of}$ to 10 degrees Fahrenheit thereby creating an "effective" setpoint of 60 degrees Fahrenheit. The exponentially decaying bias means 60 detects the change in $T_{of}$ as a signal D of $-10$ degrees Fahrenheit. With a constant C1 of zero, for example, this change in $T_{of}$ would not affect the bias means 60 so that $T_{LAG}$ would remain zero and the normal integration gain constant 35 would remain in the control circuit. The thermostat means 10, therefore, would perform a snap setback of 10 degrees Fahrenheit.

To initiate a 10 degree Fahrenheit setup following the above setback, the setup and setback means 12 would change the programmed temperature offset $T_{of}$ from 10 degrees Fahrenheit to 0 degrees Fahrenheit. The exponentially decaying bias means 60 now detects the change in $T_{of}$ as signal D of $+10$ degrees Fahrenheit. Since D is now greater than C1, $T_{LAG}$ is set equal to D and begins to exponentially decay. The "effective" setpoint thus remains at 60 degrees Fahrenheit and begins to rise exponentially to 70 degrees Fahrenheit. Input 46 to the integrator gain control logic means 45 gets pulsed to set flip-flop 49, and reset flip-flop 50, which selects gain constant 34 by closing switch 31 with input 28. Integrator gain constant 34 is normally lower than the normal gain constant 35 to reduce overshoot during the setpoint transient. The resulting control action brings on only the heating stages required to track the exponentially rising "effective" setpoint. Since the exponential constant 70 is chosen to approximate the dynamic response of the building under control (typically a one hour time constant), the rate of rise is slow enough to allow only the heat pump to turn on during mild outdoor conditions. At colder outdoor conditions, the control point cannot track the setpoint, and therefore additional heating stages are turned on as required. By extending the setup recovery to approximately two hours (with a one hour time constant), the power demand of the heating system is more diversified than a snap setpoint change. By raising the setpoint in a fashion similar to the natural response of the house rather than a ramp, not only is more efficient operation obtained, but plant cycling occurs towards the end of the recovery period rather than at the beginning. Such operation is more readily accepted by a homeowner than one that turns off the heating plant shortly after recovery has begun.

Up to this point in the description of a setup transient, the integrator signal processing channel 25 has been operating through the constant 34 at a low gain $K_S$ to minimize control point overshoot. During the transient as the current temperature error signal E grew larger than constant C2 in comparator 52, flip-flop 50 is set to indicate that a transient is well underway. Now, when steady control is reestablished, namely when the current temperature error signal E falls below constant C3 of comparator 53, the integrator gain control logic means 45 is reset and the normal gain constant 35 indicated as $K_N$ is selected.

When the power-up reset means 75 receives a pulse signal P, integrator means 37 and the three-mode integrator 66 are reset to zero by inputs 39 and 67 respectively, and the integrator gain control logic means 45 is reset to select the normal gain $K_N$ at 35. If the current temperature error E at 16 is greater than C4 of comparator 76 (typically 1 degree Fahrenheit), the exponentially decaying bias means 60 is energized to raise the "effective" setpoint exponentially to prevent the synchronization of the power demands of a community of heat pump systems following a power failure. If the current temperature error E is less than C4, flip-flop 51 is set to select the gain constant $K_F$ at 36. The gain constant $K_F$ is typically larger than the normal gain constant $K_N$ to rapidly reestablish the appropriate integrator value.

The present system has been disclosed as including a proportional constant signal processing channel means 21, a differentiating signal processing channel means 40, and the signal processing channel 25 having an integrator means 37 operating in parallel. As was previously stated, the only requirement is that the proportional constant means 21 and the signal processing channel 25 having integrator means 37 be present. It is possible to use all three simultaneously to provide a type of control in some instances. The novelty of the present invention is the combination of the signal processing means 20 including the multigain channel means 25, and control logic with an exponential decay bias means 60 to efficiently setup a heat pump system following setback without offset (droop).

The concept of the present invention has been fully disclosed as being applied to a thermostat means 10 using a multistage cycler means of the type disclosed in FIG. 2. The specific implementation of this arrangement can be accomplished by the use of microprocessor control, dedicated discrete solid state elements, or many types of electronic circuits. The implementation of the specifics are not material to an understanding nor the application of the present invention, and can be varied extensively by those skilled in the electronic art. For those reasons, the applicant wishes to be limited in the scope of his invention solely by the scope of the appended claims.

The embodiments of the invention in which an exclusive property or right is claimed are defined as follows:

1. Multistage thermostat means adapted to operate a heating plant having primary heating means and secondary heating means, including: temperature sensing means having an output signal responsive to an ambient temperature to be controlled by the operation of said heating plant; variable temperature setpoint means having an output signal to set said thermostat means to control said ambient temperature by the operation of said heating plant; first summing means having inputs connected to receive said sensing means signal, and to receive said setpoint means signal with said summing means including output means having a signal representative of a current temperature error; setpoint change means to detect an upward change in said temperature setpoint means to generate an offset signal; signal processing means including at least a proportional constant signal processing channel, and an integrating signal processing channel connected in parallel to said first summing means and to a second summing means with said second summing means having an output providing a continuous composite error signal; said integrating signal processing channel including a plurality of gain constants selectively connected to integrator means to provide said integrating signal processing channel with a selectable gain constant; integrator gain control logic means having comparator means and switching means with input means of said integrator gain control logic means connected to respond to said current temperature error and having output means connected to said integrating signal processing channel to operate switch means to select a gain constant for said integrating signal processing channel; exponential decay bias means having input means including said setpoint change means connected to said temperature offset signal, and to said current temperature error signal to cause said exponential decay bias means to generate an exponentially decaying output signal; said exponentially decaying output signal being connected to said first summing means to alter said current temperature error signal when said exponentially decaying output signal is generated; and multistage cycler means having input and output means; said multistage cycler input means connected to receive said continuous composite error signal; said cycler output means adapted to be connected to said heating plant and having a staged output signal responsive to said continuous composite error signal from said signal processing means to progressively stage said primary heating means and said secondary heating means of said heating plant.

2. Multistage thermostat means adapted to operate a heating plant having primary heating means and secondary heating means, including: temperature sensing means having an output signal responsive to an ambient temperature to be controlled by the operation of said heating plant; variable temperature setpoint means having an output signal to set said thermostat means to control said ambient temperature by the operation of said heating plant; temperature setup and setback means to generate a temperature offset signal; clock means to provide a continuous series of timed intervals; fist summing means having inputs connected to receive said sensing means signal, said temperature offset signal, and to receive said setpoint means signal with said summing means including output means having a signal representative of a current temperature error; previous offset temperature means connected to said offset signal and having a new output signal equal to said offset signal at an interval of time prior to a current interval of time; signal processing means including at least a proportional constant signal processing channel, and an integrating signal processing channel connected in parallel to said first summing means and to a second summing means with said second summing means having an output providing a continuous composite error signal; said integrating signal processing channel including a plurality of gain constants selectively connected to integrator means to provide said integrating signal processing channel with a selectable gain constant; integrator gain control logic means having comparator means and switching means with input means of said integrator gain control logic means connected to respond to said current temperature error and having output means connected to said integrating signal processing channel to operate switch means to select a gain constant for said integrating signal processing channel; exponential decay bias means with said exponential decay bias means having input means including said previous offset temperature means connected to said temperature offset signal, and to said current temperature error signal to cause said exponential decay bias means to generate an exponentially decaying output signal; said exponentially decaying output signal being connected to said first summing means to alter said current temperature error signal when said exponentially decaying output signal is generated; and multistage cycler means having input and output means; said multistage cycler input means connected to receive said continuous composite error signal; said cycler output means adapted to be connected to said heating plant and having a staged output signal responsive to said continuous composite error signal from said signal processing means to progressively stage said primary heating means and said secondary heating means of said heating plant.

3. A multistage thermostat means as described in claim 2 herein said previous offset temperature means includes zero order hold means to establish said offset signal at an interval of time prior to a current interval of time.

4. A multistage thermostat means as described in claim 2 wherein said clock means is connected to said temperature setup and setback means to adjust said thermostat means as a function of time.

5. A multistage thermostat means as described in claim 4 wherein said integrating signal processing channel includes two selectable gain constants to control said integrator to which said gain constants are connected; a first of said gain constants being a normal gain constant for said thermostat means; and a second of said gain constants reducing a signal to said integrator when said temperature setup and setback means increases a setup temperature for said thermostat means in response to said clock means.

6. A multistage thermostat means as described in claim 5 wherein said exponential decay bias means operates a three mode integrator to in turn cause said three mode integrator to generate an exponentially decaying signal that is summed into said first summing means.

7. A multistage thermostat means as described in claim 6 wherein said three mode integrator includes negative exponential constant feedback means.

8. A multistage thermostat means as described in claim 7 wherein said previous offset temperature means includes zero order hold means to establish said offset signal at an interval of time prior to a current interval of time.

9. A multistage thermostat means as described in claim 8 wherein said multistage cycler means includes a cycler stage for operation of each stage of said heating means with said stages being separated in operation by a temperature differential; said cycler stages each having a hysteresis like function.

10. A multistage thermostat means as described in claim 9 wherein said multistage cycler means includes anticipation means connected to cause the operation of said heating plant with anticipation of heat applied to said temperature sensing means from said heating plant.

11. A multistage thermostat means as described in claim 10 wherein said signal processing means further includes a differential signal processing channel connected between said first and said second summing means.

12. A multistage thermostat means as described in claim 10 wherein said thermostat means further includes power-up reset means having outputs connected to said integrator gain control logic means and to said exponential decay bias means to activate said thermostat means upon application of power of said thermostat either initially or upon restoration of power after a power failure.

13. A multistage thermostat means as described in claim 12 wherein said integrating signal processing channel includes three selectable gain constants to control said integrator to which said gain constants are connected; a first of said gain constants being a normal gain constant for said thermostat means; a second of said gain constants reducing a signal to said integrator when said temperature setup and setback means increases a setup temperature for said thermostat means in response to said clock means; and a third of said gain constants increasing a signal to said integrator means upon operation of said power-up reset means.

14. A multistage thermostat means as described in claim 13 wherein said exponential decay bias means operates a three mode integrator to in turn cause said three mode integrator to generate an exponentially decaying signal that is summed into said first summing means.

15. A multistage thermostat means as described in claim 14 wherein said three mode integrator includes negative exponential constant feedback means.

16. A multistage thermostat means as described in claim 15 wherein said previous offset temperature means includes zero order hold means to establish said offset signal at an interval of time prior to a current interval of time.

17. A multistage thermostat means as described in claim 16 wherein said multistage cycler means includes a cycler stage for operation of each stage of said heating with said stages being separated in operation by a temperature differential; said cycler stages each having a hysteresis like function.

18. A multistage thermostat means as described in claim 17 wherein said multistage cycler means includes anticipation means connected to cause the operation of said heating plant with anticipation of heat applied to said temperature sensing means from said heating plant.

19. A multistage thermostat means as described in claim 18 wherein said signal processing means further includes a differential signal processing channel connected between said first and said second summing means.

* * * * *